(12) United States Patent
Mallor

(10) Patent No.: US 12,207,622 B1
(45) Date of Patent: Jan. 28, 2025

(54) ANIMAL CONTAINMENT AND AUTOMATIC RELEASE ENCLOSURE

(71) Applicant: Neal Mallor, Ladson, SC (US)

(72) Inventor: Neal Mallor, Ladson, SC (US)

(73) Assignee: NM Ventures LLC, Ladson, SC (US)

( * ) Notice: Subject to any disclaimer, the term of this patent is extended or adjusted under 35 U.S.C. 154(b) by 0 days.

(21) Appl. No.: 18/232,957

(22) Filed: Aug. 11, 2023

(51) Int. Cl.
| | | |
|---|---|---|
| *A01K 1/03* | (2006.01) | |
| *A01K 1/00* | (2006.01) | |
| *A01K 1/02* | (2006.01) | |
| *A01K 29/00* | (2006.01) | |

(52) U.S. Cl.
CPC ............ *A01K 1/034* (2013.01); *A01K 1/0064* (2013.01); *A01K 1/0245* (2013.01); *A01K 1/0272* (2013.01); *A01K 29/005* (2013.01)

(58) Field of Classification Search
CPC .... A01K 1/0245; A01K 1/034; A01K 1/0064; A01K 1/0272; A01K 29/00
See application file for complete search history.

(56) References Cited

U.S. PATENT DOCUMENTS

| | | | | |
|---|---|---|---|---|
| 3,175,534 | A * | 3/1965 | Pollard | A01K 13/001 |
| | | | | 219/400 |
| 3,870,873 | A * | 3/1975 | Mallory | F21V 9/02 |
| | | | | 362/147 |
| 6,067,939 | A * | 5/2000 | Tominaga | A01K 1/03 |
| | | | | 119/500 |
| 6,490,995 | B2 * | 12/2002 | Greene, Jr. | A01K 1/0082 |
| | | | | 119/482 |
| 6,571,740 | B1 * | 6/2003 | Kinder | A01K 1/0245 |
| | | | | 119/497 |
| 6,710,714 | B2 * | 3/2004 | Conway | A01K 1/033 |
| | | | | 119/908 |
| 6,998,980 | B2 * | 2/2006 | Ingley, III | G08B 25/10 |
| | | | | 119/421 |

(Continued)

FOREIGN PATENT DOCUMENTS

KR 20240023975 A * 2/2024

*Primary Examiner* — Yvonne R Abbott-Lewis
(74) *Attorney, Agent, or Firm* — Ohlandt, Greeley & Perle LLP; Michael S. Bartolone

(57) ABSTRACT

An animal containment and automatic release enclosure is disclosed featuring a unitary structure providing a secure interior space for animals. The enclosure incorporates ventilation apertures, enabling the animal to access fresh air for breathing and ventilation. Environmental sensors in wireless communication with a personal device continuously monitor the enclosure's conditions, ensuring the animal's well-being. Wirelessly controlled enclosure doors, operated by an electric enclosure door control device, provide convenient access to the enclosed animal. The system further integrates external sensors, such as a carbon monoxide sensor for monitoring external CO levels, a moisture detection pad sensor to identify liquid accidents, and a temperature sensor to regulate internal temperature. The enclosure is designed to cater to various environments, including those with potential carbon monoxide exposure, making it suitable for use in multiple settings. It can be employed by veterinarians, law enforcement personnel, military professionals, security experts, pet owners, and animals trained for specific tasks. Additionally, remote access is possible through a personal communication device.

10 Claims, 5 Drawing Sheets

(56) References Cited

U.S. PATENT DOCUMENTS

| | | | | |
|---|---|---|---|---|
| 7,393,023 | B1* | 7/2008 | Kelly | G07C 9/00182 |
| | | | | 292/144 |
| 7,748,164 | B2* | 7/2010 | Hirafuji | A01K 1/031 |
| | | | | 47/60 |
| 7,997,234 | B1* | 8/2011 | Hughey | A01K 1/0245 |
| | | | | 119/500 |
| 8,113,148 | B2* | 2/2012 | Chem | A01K 5/0291 |
| | | | | 119/500 |
| 8,291,866 | B2* | 10/2012 | Cauchy | A01K 1/033 |
| | | | | 119/500 |
| 8,830,068 | B2* | 9/2014 | Campbell | A61B 5/0008 |
| | | | | 340/573.1 |
| 8,915,216 | B2* | 12/2014 | Hoegh | A01K 1/0017 |
| | | | | 119/721 |
| 9,743,636 | B1* | 8/2017 | Casebolt | A01K 29/005 |
| 10,292,369 | B1* | 5/2019 | Heath | A61B 5/0205 |
| 10,932,435 | B2* | 3/2021 | Jung | A01K 1/0035 |
| 11,516,991 | B2* | 12/2022 | Bender | B08B 13/00 |
| 11,937,579 | B2* | 3/2024 | Couse | A01K 29/005 |
| 2002/0023594 | A1 | 2/2002 | Greene | |
| 2008/0060586 | A1 | 3/2008 | Lewis et al. | |
| 2008/0264349 | A1* | 10/2008 | Hoegh | E06B 7/32 |
| | | | | 119/718 |
| 2009/0307961 | A1* | 12/2009 | Walter | A01M 23/16 |
| | | | | 43/60 |
| 2012/0199080 | A1 | 8/2012 | Siddons | |
| 2012/0234255 | A1 | 9/2012 | Bernardini et al. | |
| 2013/0055962 | A1 | 3/2013 | Scoggins | |
| 2013/0068172 | A1 | 3/2013 | Hoegh et al. | |
| 2013/0132135 | A1 | 5/2013 | Galeone | |

* cited by examiner

ANIMAL CONTAINMENT AND AUTOMATIC RELEASE ENCLOSURE

RELATED APPLICATIONS

None.

FIELD OF THE INVENTION

The present invention relates generally to an animal crate or carrier and more specifically to an animal containment and automatic release enclosure having enhanced features such as environmental sensors and remote operation.

BACKGROUND OF THE INVENTION

The inability to release a police dog from the back of a police vehicle, when necessary, presents significant difficulties and restrictions. Police canines are highly trained to assist officers in a variety of law enforcement situations, including the apprehension of suspects and the location of missing persons. However, if the dog is not promptly released, their efficacy is drastically diminished. The limited space of the police vehicle hinders the dog's mobility and ability to perform its duties effectively. In urgent situations where time is of the essence, delaying the dog's release may result in missed opportunities or the escalation of a potentially hazardous situation.

Moreover, the inability to deploy the police dog limits the officer's options and reduces their ability to effectively respond to dynamic and unpredictable situations. It is crucial for law enforcement agencies to ensure that the proper equipment and protocols are in place to allow for the prompt and secure release of police dogs when necessary, maximizing their role as indispensable assets in preserving public safety. In the event of an emergency, such as a fire or carbon monoxide leak, conventional canine pets may be confined in their enclosures in the home. Consequently, a method is required to release service dogs and other pets remotely or autonomously from their enclosures during emergency situations. The development of an animal containment and automatic release enclosure satisfies this requirement.

SUMMARY OF THE INVENTION

The application describes an innovative animal containment and automatic release enclosure with multiple features. The enclosure consists of four walls, a top, and a bottom, forming an interior space to accommodate an animal. It includes ventilation apertures in at least two walls, allowing the animal to access fresh air. The enclosure also incorporates environmental sensors in wireless communication with a personal device, such as a smartphone or tablet, to monitor conditions within and around the enclosure.

Additionally, the enclosure is equipped with a gateway hub mounted externally, which communicates with all electronic devices associated with the enclosure. This hub can use existing protocols like Z-wave, Zigbee, Wi-Fi, or Bluetooth® to facilitate communication. Moreover, the gateway hub contains a rechargeable battery and charging port, making the enclosure usable in various locations, even without AC power.

The enclosure features one or more doors that can be wirelessly controlled through electronic communication with the gateway hub. These doors can be unlocked, opened, closed, and locked using an electric enclosure door control device like a linear actuator or a servo drive.

Several external sensors are present to enhance safety and functionality. These include a carbon monoxide sensor to monitor external CO levels, a moisture detection pad sensor to detect liquid accidents, and a temperature sensor to track temperature levels around the enclosure. A main controller, along with a wireless transmitter, processes inputs from these sensors, enabling automatic actions based on the conditions.

The enclosure is adaptable for various environments, including those with potential carbon monoxide exposure. It can remotely or automatically release enclosure doors in emergencies, allowing the contained animal to escape. The enclosure can be used by veterinarians, law enforcement personnel, military personnel, security professionals, pet owners, and dogs trained for various tasks. Additionally, the personal communication device controlling the enclosure may be a mobile phone adaptable to both iOS and Android™ operating systems. Overall, the described enclosure offers advanced features for safe and efficient containment and release of animals.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
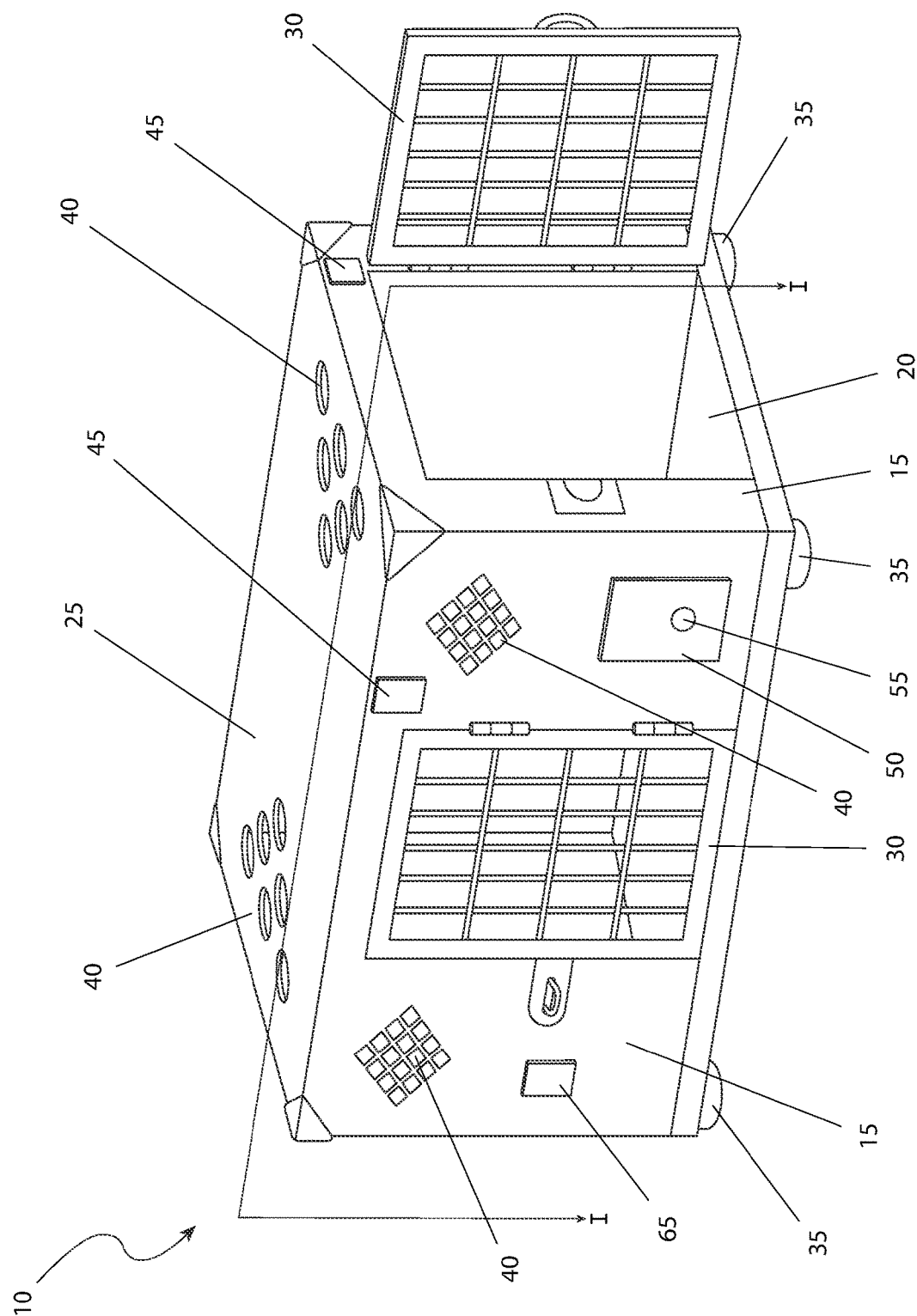
FIG. 1 is a front perspective view of the animal containment and automatic release enclosure 10, according to the preferred embodiment of the present invention.

DESCRIPTIVE KEY 10 animal containment and automatic release enclosure
15 wall
20 floor
25 top
30 door
35 foot
40 ventilation opening
45 door control device
50 gateway hub enclosure
55 charging port
60 rechargeable battery
65 carbon monoxide (CO) sensor
70 corner reinforcement
75 internet
80 first radio frequency (RF) wave
85 mobile telephone network
90 second radio frequency (RF) wave
95 personal communication device
100 user 105 animal
110 moisture detection pad sensor
115 temperature sensor
120 charge controller
125 main controller
130 wireless transmitter
135 interconnection wiring

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front perspective view of the animal containment and automatic release enclosure 10, according to the preferred embodiment of the present invention is disclosed. The animal containment and automatic release enclosure (herein also described as the "enclosure") 10, provides for remote or automatic release of at least one (1) door 30 of the enclosure 10 depending on certain external conditions. It is intended for use by law enforcement animals 105 and/or pets. The enclosure 10 is typical in design and a six-sided embodiment comprising four (4) walls 15, a floor 20, a top 25, and at least one (1) door 30. The enclosure 10 is supported by four (4) feet 35 (of which only three (3) are shown due to illustrative limitations) and is equipped with multiple ventilation openings 40 to allow for breathing and ventilation of the contained animal 105. Each door 30 is equipped with a door control device 45 to allow for both opening and closing of thereof. The door control device 45 is of an electric nature and may be a linear actuator, a servo drive, a dual solenoid/spring device, or the like. As such, the use of any specific device serving the function of the door control device 45 is not intended to be a limiting factor of the present invention.

The exterior of the enclosure 10 is provided with a gateway hub enclosure 50 that communicates with other electronic devices as will be shown below. Typically, the gateway hub enclosure 50 would be mounted to an exterior surface of a wall 15. The gateway hub enclosure 50 is equipped with a charging port 55 for charging a rechargeable battery 60 (not shown due to illustrative limitations). Battery 60 operation of the enclosure 10 allows use of the enclosure 10 in all locations, including mobile use, whether or not alternating current (AC) power is available or not. The gateway hub enclosure 50 also allows for communication with a personal communication device 95 such as mobile telephones, tablet computers, notebook computers, desktop computers, home automation panels, proprietary platforms or the like. The gateway hub enclosure 50 may use existing protocols such as Z-wave, Zigbee, Wi-Fi, Bluetooth®, or other standard or proprietary protocols. The external communication protocols used by the enclosure 10 is not intended to be a limiting factor of the present invention. The enclosure 10 also contains a carbon monoxide sensor 65 on its external surface for monitoring of carbon monoxide (CO) levels external to the enclosure 10. Such monitoring ability is viewed as being valuable should the enclosure 10 be used in a motor vehicle (such as with the case of animals 105 such as dogs used in law enforcement, drug detection, bomb detection, life-saving, or the like), in a garage, basement, or other location where carbon monoxide (CO) may be present.

Figure 2:
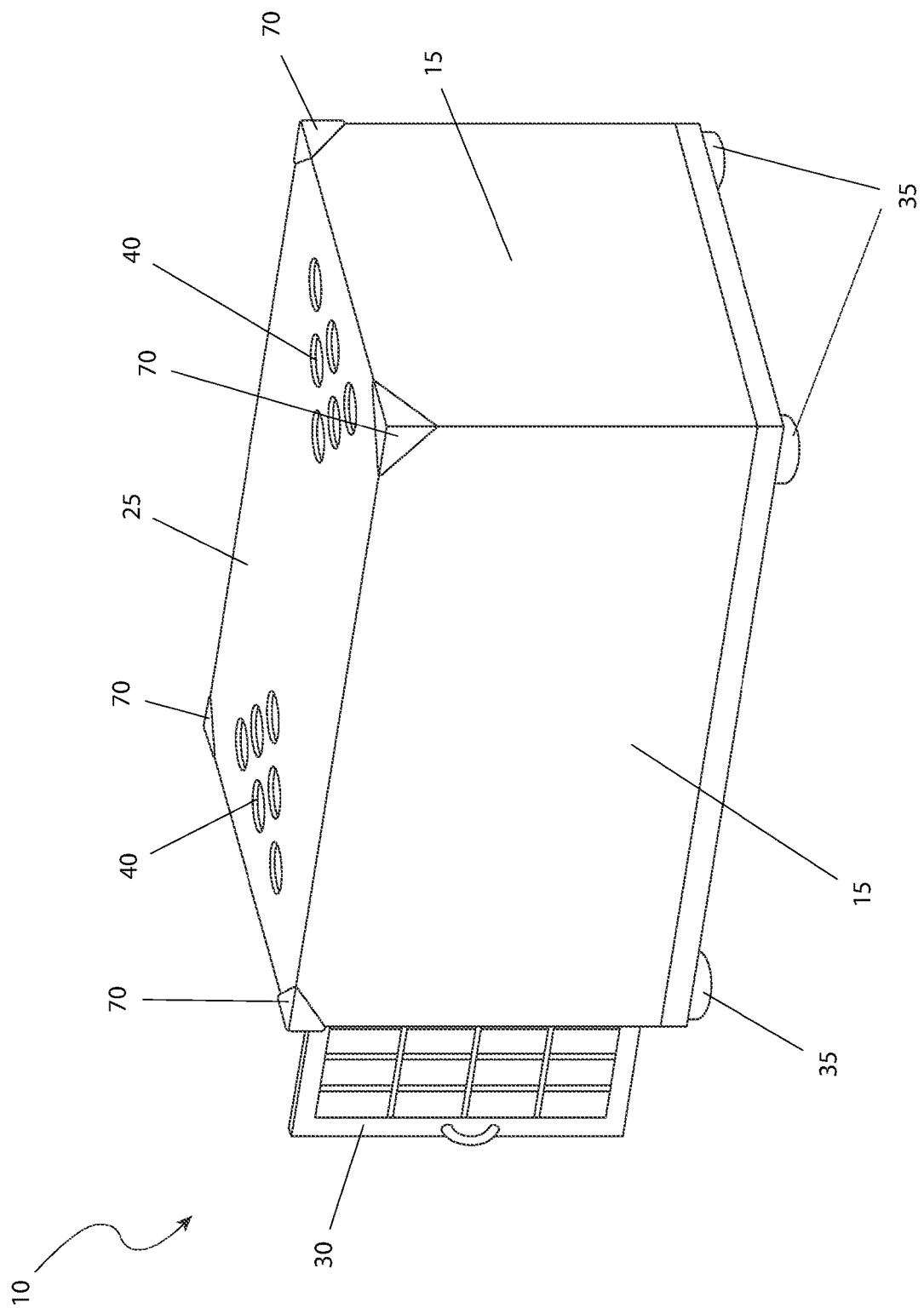
FIG. 2 is a rear perspective view of the animal containment and automatic release enclosure 10, according to the preferred embodiment of the present invention.

Referring next to FIG. 2, a rear perspective view of the enclosure 10, according to the preferred embodiment of the present invention is depicted. As previously disclosed, the enclosure 10 provides for four (4) sections of walls 15 with a top 25 piece. The top 25 is provided with ventilation openings 40. Corner reinforcements 70 may be utilized if needed depending on physical usage conditions. Three (3) of the four (4) feet 35 are visible. Finally, the door 30 remains visible in its open position on the far wall 15.

Figure 3:
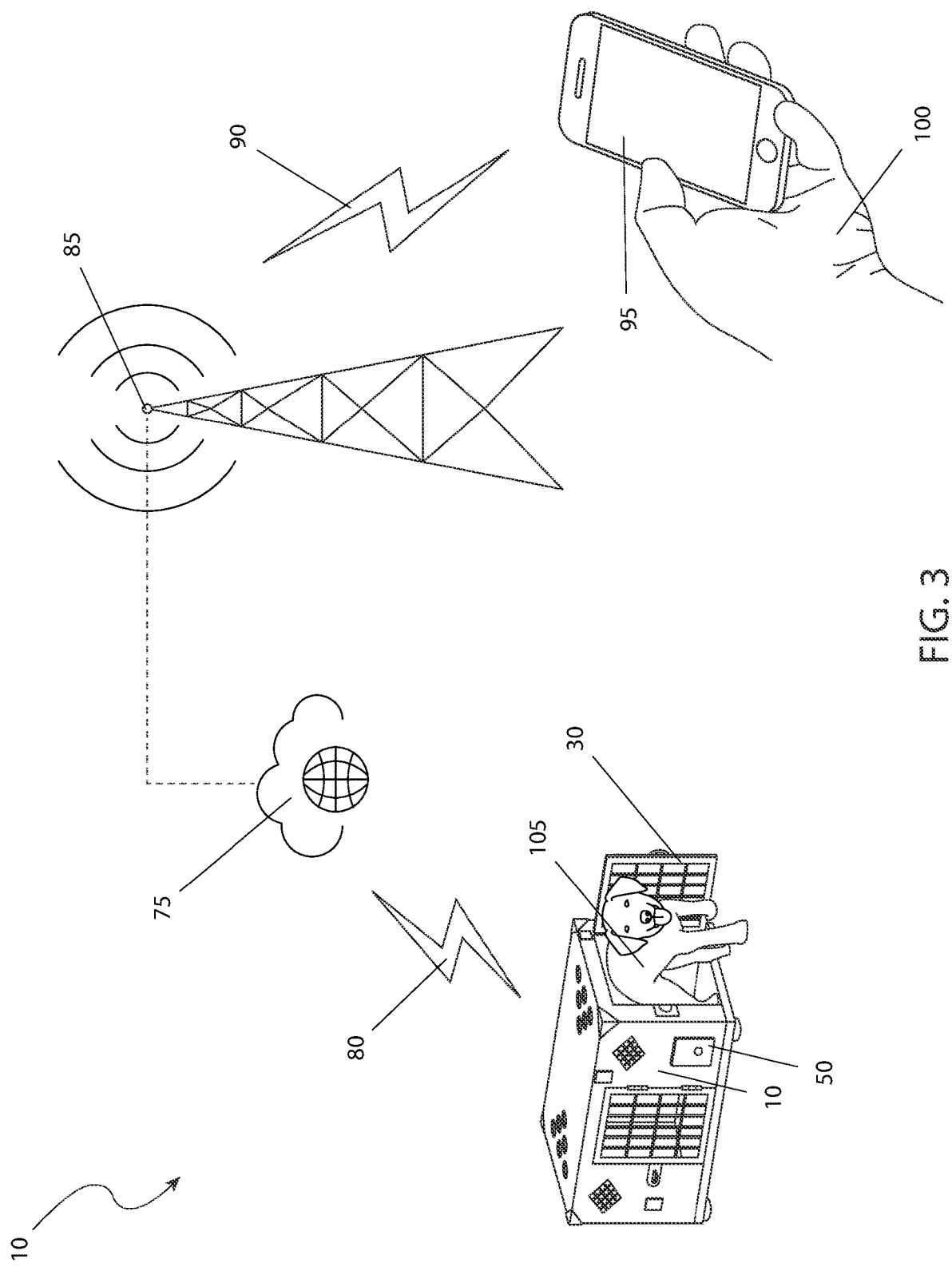
FIG. 3 is a pictorial view of the animal containment and automatic release enclosure 10, shown in a utilized state, according to the preferred embodiment of the present invention.

Referring now to FIG. 3, a pictorial view of the enclosure 10, shown in a utilized state, according to the preferred embodiment of the present invention is shown. The gateway hub enclosure 50 is in communication with the internet 75 using a first radio frequency (RF) wave 80 as previously described. Using conventional pathways, the internet 75 is connected to a mobile telephone network 85. A second radio frequency (RF) wave 90 is communication with a personal communication device 95 held by the user 100. The personal communication device 95 may be a mobile telephone as shown, or virtually any type of communication device that can be connected to the internet 75. In the instance of a mobile telephone, the personal communication device 95 would be adaptable to both the iOS or Android™ operating system. The user 100 is envisioned to be a handler of animals 105 in practice, such as that would be expected by veterinarians, law enforcement personnel, military personal, security professionals, pet owners, drug dogs, explosive and contraband detection dogs, and the like. In the event of an emergency, as determined by the associated electronics of the enclosure 10, such as the carbon monoxide (CO) sensor 65 (as shown in FIG. 1), or others to be described herein below, or by the user 100, commands may be issued by the personal communication device 95 to open all doors 30 (as shown in FIG. 1) to allow the contained animal 105 to exit. As the user 100 may be anywhere in the world, access may be granted by the user 100. Such remote access is also envisioned as valuable should the user 100 be on a different floor of a residence from the enclosure 10, or away from a vehicle containing the enclosure 10. It may also be used during training of the animal 105 for food aggression dogs, personal security guard dogs, and those who crate their animal 105 and need instant access to remotely open and close the enclosure 10.

Figure 4:
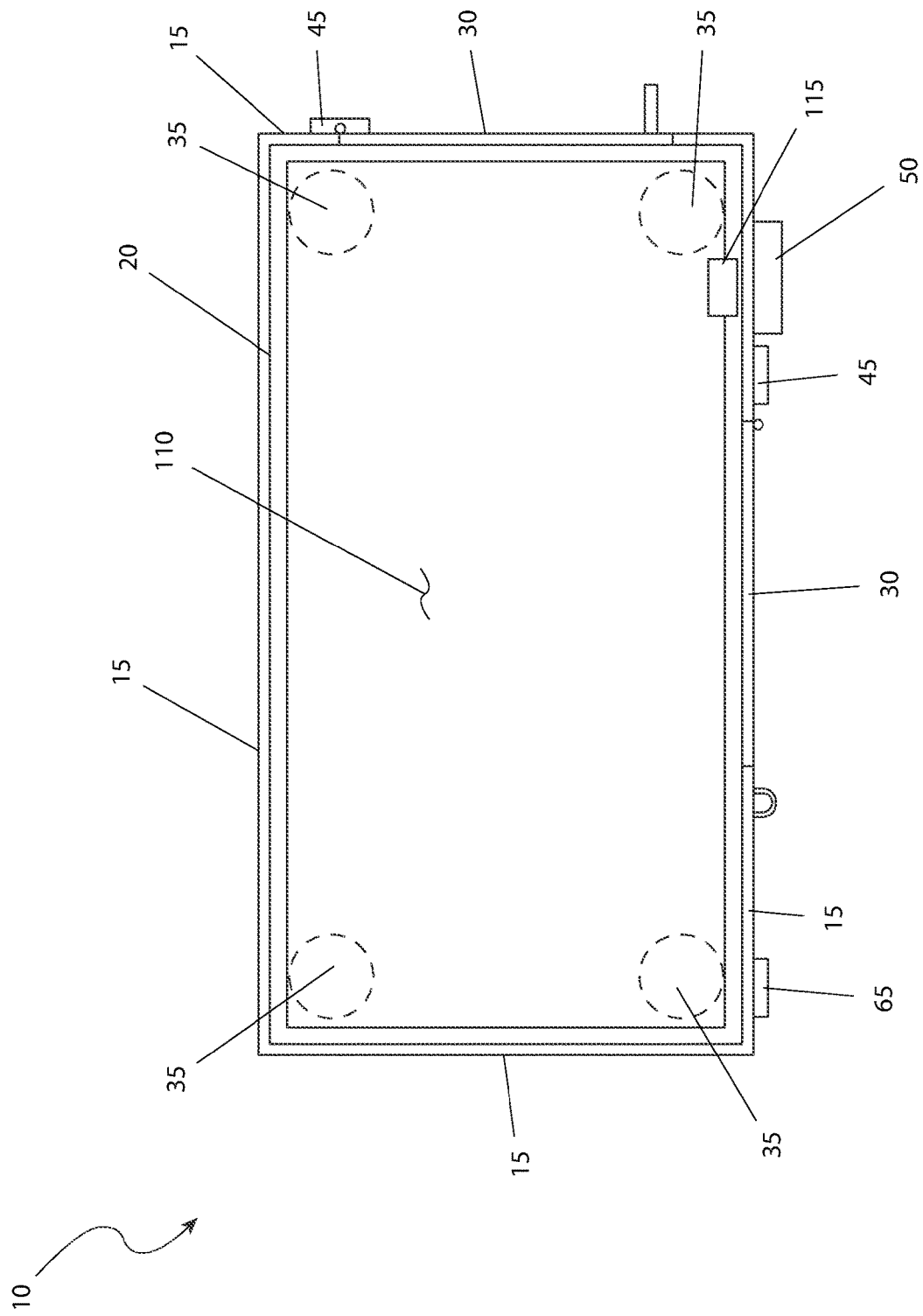
FIG. 4 is a sectional view of the animal containment and automatic release enclosure 10, as seen along a line I-I, as shown in FIG. 1, according to the preferred embodiment of the present invention; and, FIG. 5 is an electrical block diagram of the animal containment and automatic release enclosure 10, according to the preferred embodiment of the present invention.

Referring next to FIG. 4, a sectional view of the enclosure 10, as seen along a line I-I, as shown in FIG. 1, according to the preferred embodiment of the present invention is disclosed. The four (4) feet 35 are shown via dashed lines, due to their hidden nature. A moisture detection pad sensor 110 is provided on the entire surface of the floor 20, up to the confines of the walls 15. The moisture detection pad sensor 110 detects if the animal 105 (as shown in FIG. 3) has urinated, spilt water, or had another type of accident involving a liquid the enclosure 10. Such an event would produce a notification on the personal communication device 95 (as shown in FIG. 3) and indicate the animal 105 had an accident in their enclosure 10 as sensed from the moisture detection pad sensor 110, thus alerting the user 100 (as shown in FIG. 3) to take corrective action. A temperature sensor 115 detects excess hot or cold temperature levels. The gateway hub enclosure 50 (as shown in FIG. 1), provides notification of temperature to the personal communication device 95, and automatically opens any door 30, via the door control device 45, in the instance of extreme and dangerous temperatures. The carbon monoxide (CO) sensor 65 operates in a similar manner to the temperature sensor 115 with regards to remote operation and automatic opening of the doors 30 in an emergency situation.

Figure 5:
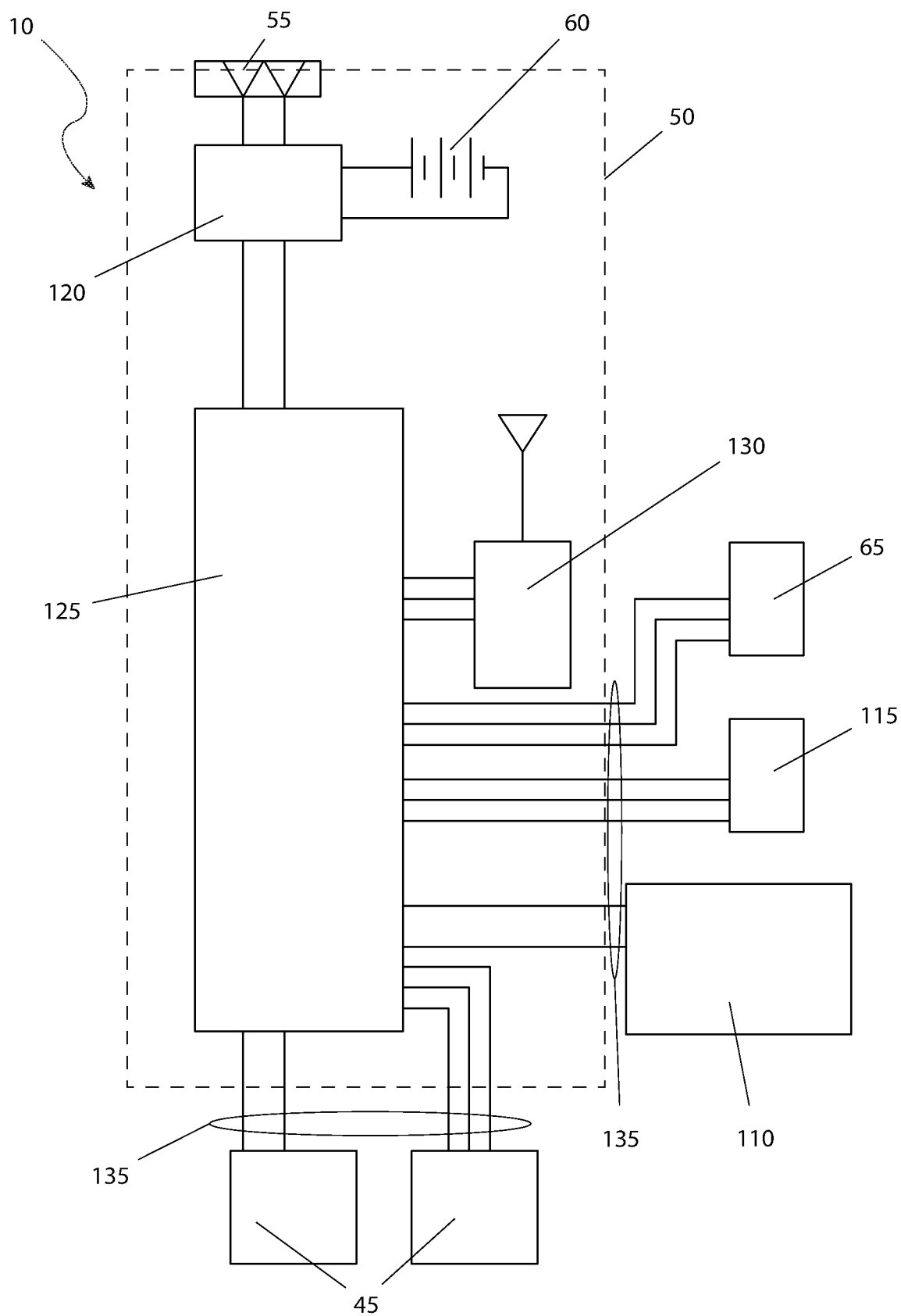

Referring to FIG. 5, an electrical block diagram of the enclosure 10, according to the preferred embodiment of the present invention is depicted. External electrical power is introduced to the enclosure 10 via the charging port 55 and is directed to a charge controller 120. In turn, the charge controller 120 maintains an electrical charge upon the rechargeable battery 60 and provides uninterrupted power to a main controller 125. Should electrical power be removed from the charging port 55, the rechargeable battery 60 provides adequate capacity to maintain operation of the enclosure 10 for an extended period of time. The main controller 125 is provided with input signals from the carbon monoxide (CO) sensor 65, the temperature sensor 115 and the moisture detection pad sensor 110, and will make automatic, parameter-based actions depending on the values received. Additionally, the wireless transmitter 130 provides both input and output functionality to the main controller 125 and allows for sending of notifications and receiving commands from the wireless transmitter 130. The main controller 125, envisioned to be a single board computer (SBC) such as a RaspberryPi®, Arduino®, or the like, provides notification if any door 30 (as shown in FIG. 1) were manually opened as well as a log of all operations, including sensor values from the carbon monoxide (CO) sensor 65, the temperature sensor 115, and the moisture detection pad sensor 110. The main controller 125 provides output signals to any door control devices 45 to unlock, open, close, and lock the respective door 30. It is noted that the charging port 55, the rechargeable battery 60, the charge controller 120, the main controller 125, and the wireless transmitter 130 are all contained within the gateway hub enclosure 50. Remote items to the gateway hub enclosure 50, such as the carbon monoxide (CO) sensor 65, the temperature sensor 115, the moisture detection pad sensor 110, and the door control device 45 are provided with interconnection wiring 135.

2. Operation of the Preferred Embodiment

The preferred embodiment of the present invention can be utilized by the common user in a simple and effortless manner with little or no training. It is envisioned that the enclosure 10 would be constructed in general accordance with FIG. 1 through FIG. 5. The user 100 would procure the enclosure 10 from conventional procurement channels such as pet stores, veterinarian supply houses, law enforcement supply houses, military suppliers, and the like. Special attention would be paid to the overall size of the enclosure 10, such that it would fit in the desired location as well as being appropriate for the size of the animal 105.

After procurement and prior to utilization, the rechargeable battery 60 would be charged by connecting an external power source to the charging port 55 for an appropriate period of time. The wireless transmitter 130 included in the gateway hub enclosure 50, would be paired and active with the appropriate monitoring system (Z-wave, Zigbee, Wi-Fi, or the like). The personal communication device 95 would be interconnected with the appropriate monitoring system if not already done so. The enclosure 10 would be placed in the area of intended use. At this point in time, the enclosure 10 is ready for utilization.

During utilization of the enclosure 10 in an automatic manner, the animal 105 would be placed in the enclosure 10 and all doors 30 secured in a conventional manner. Should excessive high or low temperatures, or excessive carbon monoxide (CO) levels be detected by the temperature sensor 115 and the carbon monoxide (CO) sensor 65 respectively, the main controller 125 will automatically open all doors 30 and provide notification to the personal communication device 95.

During utilization of the enclosure 10 in a manual/remote manner, all levels from the carbon monoxide (CO) sensor 65, the temperature sensor 115 and the temperature sensor 115 will be provided to the personal communication device 95 on a continuous basis, along with the open/close status of any doors 30 as controlled by the door control device 45. Should the user 100 wish to open or close any doors 30, the user 100 may issue a command to do so. Such actions are viewed as advantageous to law enforcement officers, military personnel, emergency personnel, or anyone who enlists the services of a trained animal 105. Such services are also beneficial to users 100 who are veterinarians, trainers, and pet owners who wish to control access to and from the enclosure 10 from a remote location.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An animal containment and automatic release enclosure comprising:
    four enclosure walls;
    an enclosure top; and,
    an enclosure bottom; and,
        wherein the four enclosure walls, enclosure top, and enclosure bottom form a unitary animal containment and automatic release enclosure structure further defining an interior animal containment and automatic release enclosure space;
    a foot disposed under each corner of an underside surface of the enclosure bottom;
    a plurality of ventilation apertures disposed within at least two enclosure walls;
    a gateway hub enclosure mounted to an exterior surface of the animal containment and automatic release enclosure;
    a moisture detection pad sensor provided on an upper surface of the enclosure bottom, capable of detecting if the contained animal has urinated, spilled water, or had another type of liquid accident;

a temperature sensor capable of detecting and registering temperature levels about the animal containment and automatic release enclosure;

a carbon monoxide sensor on an external surface of the animal containment and automatic release enclosure for monitoring of carbon monoxide (CO) levels external to the enclosure;

a plurality of environmental sensors in wireless communication with a personal communication device; and, at least one enclosure door disposed within the animal containment and automatic release enclosure; and, wherein the interior animal containment and automatic release enclosure space is configured in size to accommodate an animal;

wherein the plurality of ventilation apertures is configured to permit the animal within the interior animal containment and automatic release enclosure access to fresh air for breathing and ventilation;

wherein the gateway hub enclosure communicates via electrical wiring or wirelessly with all electronic devices associated with the animal containment and automatic release enclosure;

wherein the gateway hub enclosure communicates with a personal communication device, such as mobile telephones, tablet computers, notebook computers, desktop computers, home automation panels, proprietary platforms, or a similar device, using existing protocols such as Z-wave, Zigbee, Wi-Fi, Bluetooth®, or other standard or proprietary protocols;

wherein the gateway hub enclosure is equipped with a charging port and a rechargeable battery in electrical communication with the charging port that allows use of the enclosure in all locations, including mobile use, whether or not alternating current (AC) power is available or not;

wherein any enclosure door is individually equipped with an enclosure door control device allowing for wireless opening and closing of each respective enclosure door through electronic communication with the gateway hub; and, wherein the enclosure door control device is electric and may be a linear actuator, a servo drive, a dual solenoid/spring device, or the like.

2. The animal containment and automatic release enclosure of claim 1, wherein the enclosure is operable with a main controller, a rechargeable battery, and a wireless transmitter, wherein the rechargeable battery maintains power and the main controller makes automatic, parameter-based actions based on input signals from a carbon monoxide sensor, the temperature sensor, and the moisture detection pad sensor.

3. The animal containment and automatic release enclosure of claim 2, wherein the wireless transmitter provides both input and output functionality to the main controller and allows for sending of notifications and receiving commands.

4. The animal containment and automatic release enclosure of claim 3, wherein the main controller provides notification if any enclosure door was manually opened and keeps a log of all operations, including sensor values from the carbon monoxide sensor, the temperature sensor, and the moisture detection pad sensor.

5. The animal containment and automatic release enclosure of claim 4, wherein the main controller provides output signals to the enclosure door control devices to unlock, open, close, and lock the respective enclosure doors.

6. The animal containment and automatic release enclosure of claim 5, wherein the enclosure is adaptable for use in various environments, including inside motor vehicles, garages, basements, and other locations where a lethal quantity of carbon monoxide may be present.

7. The animal containment and automatic release enclosure of claim 6, wherein the enclosure allows for remote or automatic release of at least one enclosure door depending on certain external conditions, enabling the contained animal to exit in emergency situations.

8. The animal containment and automatic release enclosure of claim 7, wherein the personal communication device may issue commands to open all enclosure doors of the enclosure, providing remote access to the contained animal.

9. The animal containment and automatic release enclosure of claim 1, wherein the enclosure is configured for use by veterinarians, law enforcement personnel, military personnel, security professionals, pet owners, and dogs used in various fields such as drug detection, bomb detection, lifesaving, and personal security.

10. The animal containment and automatic release enclosure of claim 1, wherein the personal communication device may be a mobile telephone adaptable to both an iOS and Android™ operating systems.

* * * * *